FIGURE I
EFFECT OF DILUENT ON MgO SURFACE AREA IN THE DEHYDROGENATION OF ETHYLBENZENE
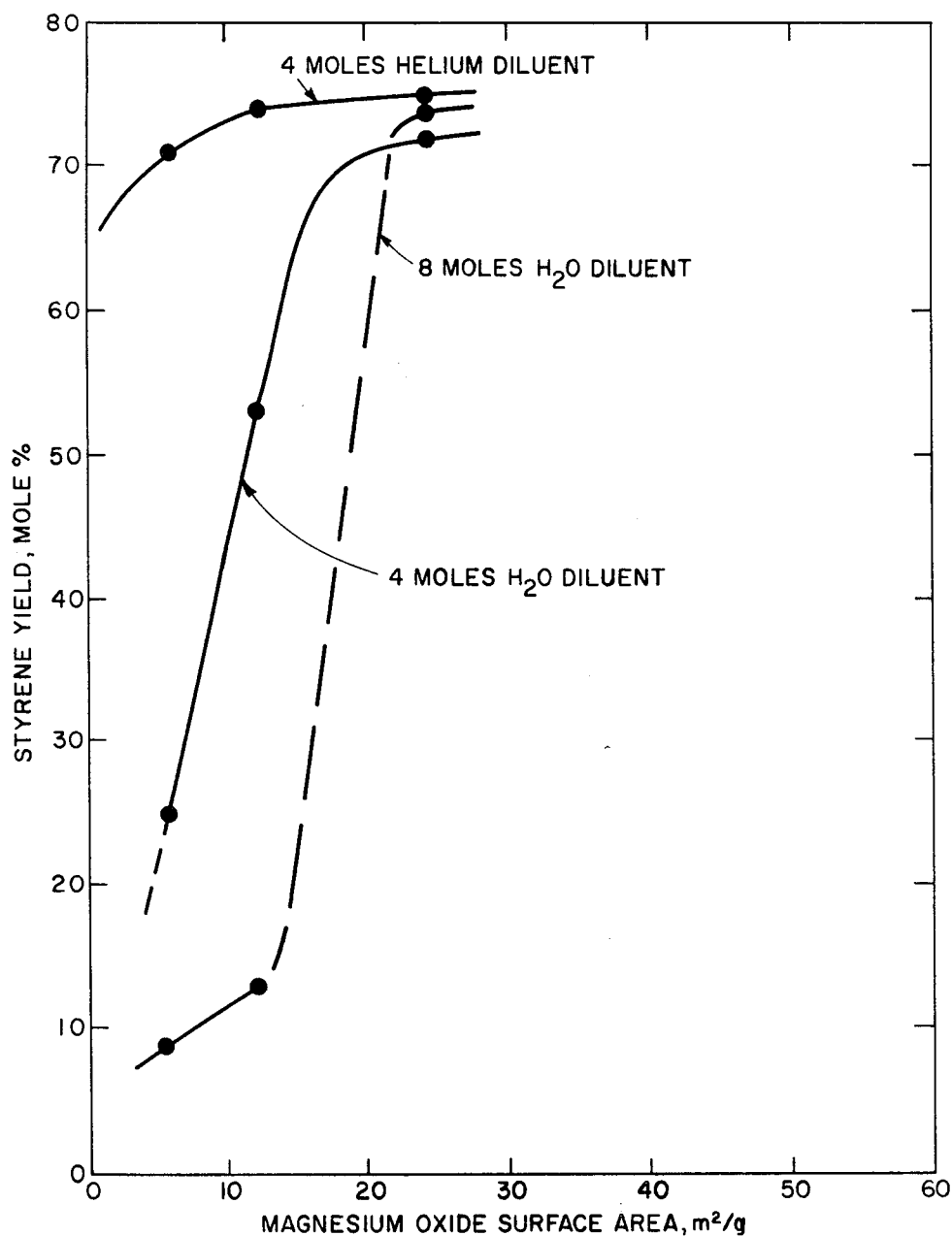
I. S. Pasternak
N. J. Gaspar
A. D. Cohen
M. Vadekar
Inventors
By  Attorney

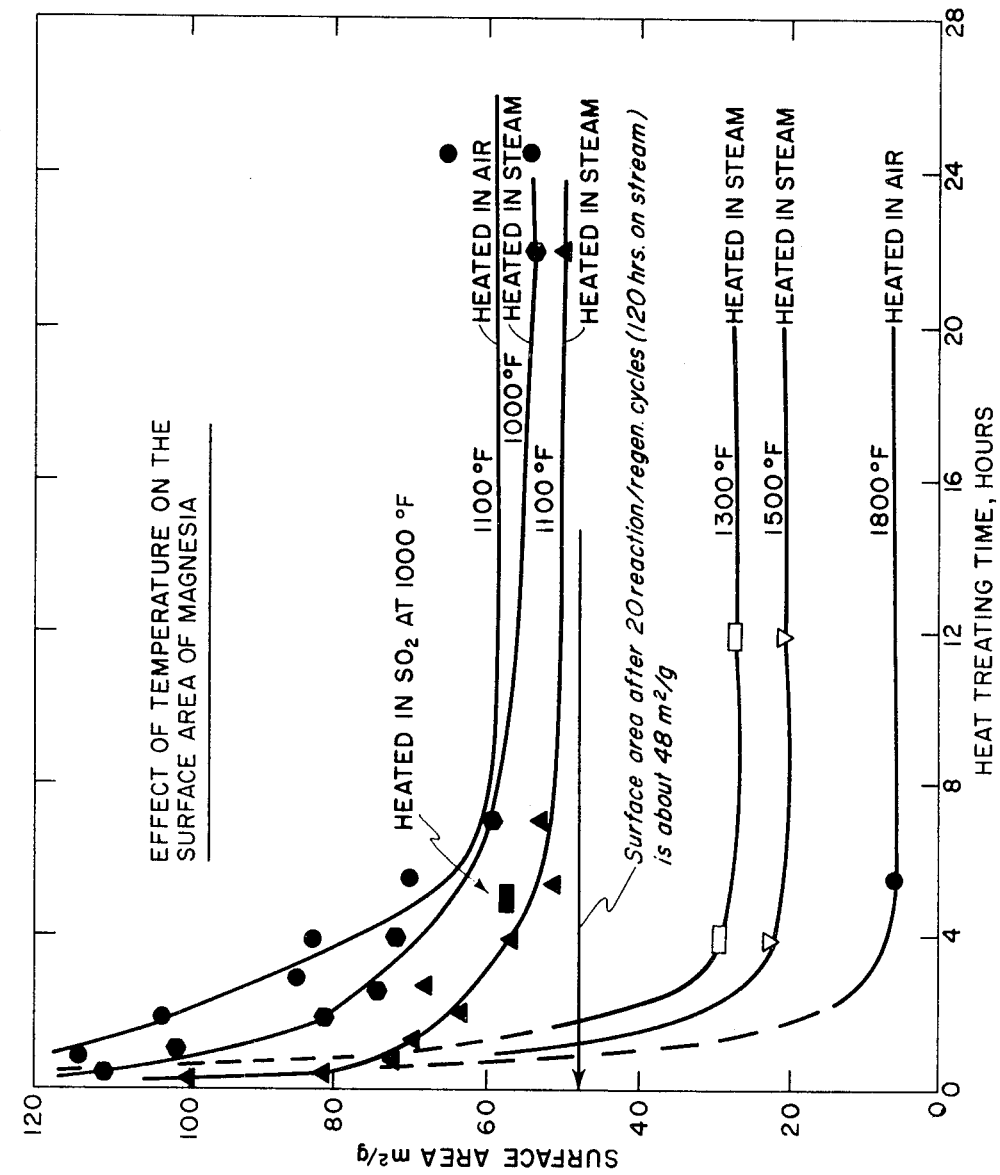

United States Patent Office 3,636,183
Patented Jan. 18, 1972

3,636,183
PROCESS FOR THE DEHYDROGENATION OF ORGANIC COMPOUNDS
Israel S. Pasternak, Noel J. Gaspar, Abraham D. Cohen, and Mohan Vadekar, Sarnia, Ontario, Canada, assignors to Esso Research and Engineering Company
Continuation-in-part of application Ser. No. 780,528, Dec. 2, 1968. This application Dec. 19, 1969, Ser. No. 886,582
Int. Cl. C07c 5/20, 11/02, 15/10
U.S. Cl. 260—669                         18 Claims

ABSTRACT OF THE DISCLOSURE

Organic compounds having a dehydrogenatable carbon to carbon bond, e.g. ethylbenzene, are dehydrogenated in a vapor phase reaction by contact with a sulfur oxide in the presence of steam over a critically defined low surface area magnesium oxide catalyst. The temperature at which the reaction is conducted is generally in the range of from about 800 to about 1500° F. The molar ratio of the steam to the dehydrogenatable organic compound is at least about 1:1, preferably a molar ratio of about 10 moles of steam per mole of dehydrogenatable compound is employed. The amount of sulfur oxide employed in the reaction is in the range of from about 0.01 to 1.0 and more preferably from about 0.2 to 0.7 mole of sulfur dioxide per mole of hydrogen extracted from the dehydrogenatable organic compound. For example, the dehydrogenatable compound is ethylbenzene, which is converted by the above-described reaction to styrene, an important petrochemical intermediate for the production of synthetic rubber and of polystyrene plastics.

CROSS-REFERENCE TO RELATED APPLICATION

This application is a continuation-in-part of U.S. Ser. No. 780,528, filed Dec. 2, 1968.

FIELD OF THE INVENTION

This invention relates to a process for the vapor phase dehydrogenation of organic compounds. More particularly, this invention relates to a process for dehydrogenating a compound having at least one

grouping, wherein adjacent carbon atoms are bonded to each other and have at least one hydrogen atom attached to each carbon atom, such as ethylbenzene, by contacting such compounds with sulfur oxides, i.e., $SO_2$, or $SO_3$ or water solutions thereof in the presence of steam over a critically defined low surface area magnesium oxide catalyst. In a typical embodiment, ethylbenzene is dehydrogenated in high yields to styrene by contacting ethylbenzene with from about 0.2 to 0.7 mole of sulfur dioxide per mole of ethylbenzene in the presence of steam over a magnesium oxide catalyst having a surface area in the range of from about 4 to about 80 square meters per gram.

PRIOR ART

The catalytic, vapor phase dehydrogenation of organic compounds to produce unsaturated or more highly unsaturated products than the feed in the presence of sulfur dioxide is an old and well known process, see for example, U.S. Pat. 2,126,817. Generally, the overall endothermic reaction for the sulfur dioxide dehydrogenation of a hydrocarbon feedstock is in accordance with the following generalized formula:

$$3C_nH_{2n+2} + SO_2 \rightarrow 3C_nH_{2n} + H_2S + 2H_2O \quad (1)$$

which shows that one-third mole of sulfur dioxide is theoretically required to dehydrogenate one mole of feedstock. While many processes have been reported, the commercial development of a sulfur dioxide process has been rather permanently delayed due to serious problems involving catalyst life. Thus, it is believed that, while dehydrogenation is the principal reaction occurring, a portion of the feedstock and product is being simultaneously degraded to form coke. This coke is formed at the surface of the catalyst, thereby shielding the catalyst from the reactants and causing rapid catalyst deactivation. The coke reaction is further promoted by the presence of sulfur-containing compounds which are known to promote coking at reaction temperatures and are generally present due to side reactions between the hydrocarbon and $SO_2$. See, for example, U.S. Pat. 3,299,155 and Japanese Pat. 23,165/65 wherein the mole ratio of sulfur dioxide to hydrocarbon charge is maintained at from about 1:1 to about 2:1; and at about 1.3:1 respectively. Furthermore, when sulfur levels below those claimed are employed, such as to approach the stoichiometric equivalent, there is a significant loss in yield to the desired dehydrogenated compound (see Japanese Pat. 23,165/65—Table 1). Consequently, the use of such high sulfur levels, in addition to drastically reducing catalyst life by promoting coke formation, significantly reduces the conversion level and selectivity, and thus the yield to the desired dehydrogenated compounds. Furthermore, it is highly desirable in commercial applications to employ an inert diluent to reduce hydrocarbon losses to burning, coke and heavy products. Preferably, this inert diluent is steam in order to facilitate a relatively easy product recovery system. Unfortunately, the catalysts reported in the prior art are severely deactivated in the presence of steam (see, for example: Adams, C. R., American Chemical Society Division of Petroleum Chemistry Preprints, page C9, FIG. 4, New York City Meeting, September 1969). By the process of this invention, however, the disadvantages of the prior art are greatly alleviated in that steam may be employed as the inert diluent without deactivating the catalyst, and catalyst life is markedly increased thereby resulting in high yields of dehydrogenated product over long reaction periods.

SUMMARY OF THE INVENTION

In accordance with this invention, therefore, the vapor phase catalytic dehydrogenation of dehydrogenatable organic compounds is effected by contacting the dehydrogenatable compound with a sulfur oxide, in the presence of steam, over a critically defined lower surface area magnesium oxide catalyst, as will be hereinafter discussed.

While not wishing to be bound to any particular theory, it is believed that the success of the process described herein is due in large part to the discovery that low surface area catalysts are selective in promoting the desired reaction and tend to minimize hydrocarbon burning and coke formation. As has been described in our copending application, U.S. Ser. No. 780,528, filed Dec. 2, 1968, the use of such catalysts is then a reversal from the general trend in catalysis. Since high surface area catalysts have been used successfully in exothermic reactions, it would appear reasonable to believe that they could be effectively used in endothermic reactions also. Nevertheless, it has been found that high surface area catalysts are ineffective and that low surface area catalysts are essential to the practice of the instant invention. Thus, high surface area catalysts tend to increase (catalyze) the rate of burning reactions, e.g., $$C_nH_{2n+2} + \frac{(3n+1)}{2} SO_2 \rightarrow nCO_2 + (n+1)H_2O + \frac{(3n+1)}{2} S \quad (2)$$

thereby giving rise to two major disadvantages. First, since the burning reaction will require far more $SO_2$ per mole of dehydrogenatable organic compound than the desired dehydrogenation reaction, burning of only a small amount of hydrocarbon removes a large amount of $SO_2$ from the system and makes it unavailable for dehydrogenation. Secondly, since burning is an exothermic reaction, whereas dehydrogenation with $SO_2$ is endothermic, any amount of burning will tend to heat the catalyst bed resulting in either localized or generalized hot spot formation. The hot spots then will tend to increase the rate of burning and cracking reactions as well as increasing catalyst fouling due to coke formation. Thus, hot spots give rise to both a lower yield of desired products and rapid catalyst deactivation.

Accordingly, it is essential to employ a low surface area catalyst for the reaction described herein. This requirement is necessitated by the fact that the catalyst must be selective to the desired reaction while inhibiting undesired side reactions such as cracking and/or burning. It has now been discovered that when the diluent employed in the instant process is steam, or essentially all steam, a critical surface area range for magnesium oxide exists within which the yield of dehydrogenated product is markedly greater than would ordinarily be expected.

As mentioned above, it is essential in commercial applications to employ an inert diluent to reduce the partial pressure of the reactants in the reaction zone in order to prevent undue loss of hydrocarbons to burning, coke and heavy products. Thus, the use of an inert diluent, by minimizing hydrocarbon losses to coke, significantly increases the catalyst life to achieve continuous high conversion and selectivity levels to the desired dehydrogenated product.

The inert diluent which is employed in the practice of the instant invention to reduce the partial pressure of the reactants is steam or a mixture of diluents which is primarily steam. It is desirable, for economic reasons, to use as much condensable diluent, i.e., steam, as possible to facilitate product separation without resorting to extensive refrigeration techniques which must be used when non-condensable diluents, such as nitrogen or carbon dioxide, are employed. As mentioned above, while prior art dehydrogenation catalysts are severely deactivated in the presence of steam, the ability of the magnesium oxide catalyst—within the critically defined surface area—to maintain catalyst life and conversions and selectivity to the desired dehydrogenated compound when steam is employed as the inert diluent is a unique feature of the instant invention.

It is economically advantageous to use as little steam diluent as possible while accomplishing the above mentioned criteria of reducing hydrocarbon losses to burning, coking, etc. Generally, at least one mole of steam/mole of dehydrogenatable hydrocarbon is present in the reaction zone. This value, however, is merely an arbitrary limit at which the yield of dehydrogenated product becomes practical and economical. Generally, the conversion and yield to the dehydrogenated compound increase with increased dilution. The upper limit of dilution is a function of the surface area of the catalyst and the reaction temperature. Generally, however, a molar ratio of from 1 to about 20, preferably a molar ratio of from about 1 to about 12 and more preferably a molar ratio of from about 4 to about 12 moles of steam per mole of dehydrogenatable compound are employed.

Thus, in accordance with the practice of the instant invention, when steam is employed as the inert diluent, a critical surface area range starting above a threshold surface area of about 4 m.$^2$/g. exists for magnesium oxide where the yield of dehydrogenated product increases by about tenfold. A critical upper surface area limit where product yield falls off sharply does not exist for the magnesium oxide catalyst since the upper limit depends upon the reaction temperatures employed. When reaction temperatures above about 1000° F. are employed, after about 6 hours reaction time the surface area of the magnesium oxide catalyst stabilizes below 80 square meters per gram. Consequently, it is preferred that the magnesium oxide catalyst have a surface area ranging from about 4 to 80 square meters per gram, more preferably from about 10 to about 70 square meters per gram and still more preferably from about 20 to about 60 square meters per gram.

DESCRIPTION OF THE DRAWINGS

FIG. 1 shows a plot of magnesium oxide surface area against mole percent yield of styrene from ethylbenzene dehydrogenation. The top curve reflects the styrene yield when 4 moles of non-condensable helium diluent are employed per mole of ethylbenzene. The middle and bottom curves represent the styrene yield when 4 and 8 moles of steam are employed as the diluent per mole of ethylbenzene, respectively. It is noted that the top curve exhibits a relatively small slope at low surface areas while exhibiting a styrene yield of above 65 mole percent and up to the range of about 75 mole percent. However, when steam is employed as the inert diluent, the slope of each curve exhibits a sharp break when the critical threshold surface area is reached, i.e. about 4 square meters per gram when 4 moles of steam are employed as the diluent and at about 12 square meters per gram when 8 moles of steam are employed as the diluent. It is noted that after the sharp break in the curves, i.e. when the critical threshold surface areas are reached, a significant increase in the yield of styrene occurs and that the styrene yield reaches a maximum at about 22 square meters per gram. Thus, it is seen that the use of helium as an inert diluent is clearly not equivalent to employing steam as the inert diluent in the practice of the instant invention. The data for these curves were obtained in an ethylbenzene dehydrogenation, the ethylbenzene/sulfur dioxide mole ratio being 1/0.37, at a temperature of 1075° F. and atmospheric pressure over a magnesium oxide catalyst using an ethylbenzene space velocity of 0.5 w./w./hr.

FIG. II illustrates the effect of temperature under a variety of conditions, on a magnesium oxide catalyst having an initial surface area of about 170 m.$^2$/g. In FIG. II, surface area in m.$^2$/g., as obtained on a Shell-Perkin Elmer Sorptometer employing the single point technique, is plotted against time in hours of heat treatment.

For the uppermost and lowest of the six curves plotted, heat treating at 1100° F. and 1800° F., respectively, was carried out in air, while for the other four curves heat treating at 1000° F., 1100° F., 1300° F. and 1500° F. respectively, was carried out in an atmosphere of predominantly steam. The effect of $SO_2$ on heat treatment at 1000° F. for four and a half hours is also given. Finally, for comparative purposes, at the far right of the graph the surface of the magnesia used as a catalyst in twenty consecutive runs 120 hrs. on stream) is given.

It will be noticed that all six curves show a sharp declining slope in that the surface area of the catalyst declines rapidly until an equilibrium is reached after about 6 hours of treating time. Consequently it is seen that the upper surface area limit for the magnesium oxide catalyst in square meters per gram depends upon the reaction conditions employed. It is preferred that the magnesium oxide catalyst have an upper limit surface area ranging from below about 80 square meters per gram, preferably below about 70 square meters per gram, and more preferably below about 60 square meters per gram.

The advantages of discovering this critical surface area level for magnesium oxide, in which yields are markedly increased, are manifest. Perhaps most importantly, however, and aside from the increased product yield, is the rather low sulfur dioxide level that is employed. As previously mentioned, sulfur promoted reactions required high sulfur compound levels to obtain reasonable conversions and yields. In turn, high sulfur compound levels tended to increase catalyst coking and resulted in very short catalyst life spans. The low sulfur oxide levels which can be employed in the practice of the instant invention result in excellent conversions and long catalyst life spans.

The process of this invention can be applied to a great variety of dehydrogenatable organic compounds to obtain the unsaturated derivatives thereof. A suitable dehydrogenatable compound can be any organic compound that contains at least one

grouping, i.e. adjacent carbon atoms bonded to each other and each attached to at least one hydrogen atom. Preferably, such compounds have from 2 to about 20 carbon atoms. In addition to carbon and hydrogen, these compounds may also contain oxygen, halogen, nitrogen and sulfur. Among the classes of organic compounds which can be dehydrogenated by this process are: alkanes, alkenes, alkyl halides, ethers, esters, aldehydes, ketones, organic acids, alkyl aromatic compounds, alkyl heterocyclics, cyanoalkanes, cyanoalkenes, and the like. Illustrative, non-limiting examples include: ethylbenzene to styrene, isopropylbenzene to alpha-methyl styrene, cyclohexane to benzene, vinyl cyclohexane or vinyl cyclohexene to styrene, chloroethylbenzene to chlorostyrene, ethane to ethylene, n-butane to butenes and butadiene, butene to butadiene, isobutane to isobutylene, methyl butene to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine, ethylphenol to vinylphenol, and the like. Preferred dehydrogenatable feed stocks are the $C_2$–$C_{20}$ hydrocarbons, i.e., paraffins, alkyl benzenes, alkyl and alkenyl substituted cycloaliphatic compounds and monoolefins. Particularly preferred, however, are $C_2$–$C_9$ paraffins, $C_3$–$C_9$ monoolefins, $C_8$–$C_{16}$ alkyl benzenes, and $C_8$–$C_{16}$ alkyl and alkenyl substituted cycloaliphatic compounds, still more particularly $C_4$–$C_8$ monoolefins and paraffins, $C_8$–$C_{10}$ alkyl benzenes, and $C_8$–$C_{10}$ alkyl and alkenyl substituted cycloaliphatic compounds. Particularly effective as feed stocks are the olefinic hydrocarbons or alkyl benzenes or vinyl substituted cycloaliphatics which may be dehydrogenated to provide a product wherein the major unsaturated product has the same number of carbon atoms as the feed hydrocarbon. Ethylbenzene is a particularly preferred dehydrogenatable compound and its reaction with sulfur dioxide in accordance herewith results in ethylbenzene conversions in excess of 75%, preferably 80%, and more preferably 85% with selectivity to styrene in excess of 85%, preferably 90%, resulting in styrene yields in excess of 70%, preferably in excess of 75%.

In yet another embodiment, dehydrocyclization can also be effected. Thus, $C_6$–$C_8$ paraffins, e.g. hexane, heptane, octane, can be converted into $C_6$–$C_8$ aromatics, e.g., benzene, toluene, ethylbenzene, paraxylene.

The conditions under which the reaction is effected are not generally critical and can be the conditions under which normal vapor phase catalytic dehydrogenation reactions are effected. Thus, reaction temperatures should be at least about 700° F., preferably 800 to 1500° F., and more preferably 900 to 1200° F. Similarly, pressures may vary over a wide range and can range from subatmospheric, e.g. 0.1 atmosphere to superatmospheric, e.g. 50 atmospheres or higher. Preferably, however, pressures may range from about 1 to about 3 atmospheres.

As has been previously stated herein, it has normally been the practice to utilize relatively large amounts of sulfur dioxide in the dehydrogenation reactions, i.e. see U.S. Pat. 3,299,151. As previously mentioned, such high levels of sulfur compound, however, tend to drastically reduce catalyst life by promoting the formation of coke. Now, in accordance with the present invention, a sulfur oxide is employed, i.e. $SO_2$ or $SO_3$ or $SO_2/SO_3$ mixtures or their water solutions $H_2SO_3$, $H_2SO_4$, but preferably $SO_2$, and Table I below shows the levels that can be satisfactorily employed herein:

TABLE I

| | Broad | Preferred | More preferred | Most preferred |
|---|---|---|---|---|
| Mol $SO_2$/mol $H_2$ abstracted | 0.01–1.0 | 0.2–1.0 | 0.2–0.7 | 0.2–0.5 |
| Mol $SO_3$/mol $H_2$ abstracted | 0.007–1.0 | 0.15–1.0 | 0.15–0.6 | 0.15–0.4 |

Molar ratios are based on the amount of $SO_2$ or $SO_3$ present therein. It is noted that the term "mol of hydrogen to be abstracted" is used in conjunction with the sulfur level employed (dehydrogenation occurs by abstraction of hydrogen). Thus, for example, in the dehydrogenation of butane to butene, one mole of hydrogen is abstracted but in the dehydrogenataion of butane to butadiene, two moles of hydrogen are abstracted. Therefore, the term is meaningful and directly related to the actual reaction. It is also noticed that the sulfur levels are quite low, relative to the prior art, thereby reducing coke formation tendencies and lengthening catalyst life.

The rate of feeding the dehydrogenatable compound over the catalyst bed, i.e. the space velocity, may vary rather widely, such as from 0.01 w./w./hr. (weight of feed/weight of catalyst/hour) to 10 w./w./hr., preferably 0.05 to 1 w./w./hr., more preferably 0.3 to 0.8 w./w./hr.

In a typical reaction sequence involving this invention, the feed charge containing ethylbenzene, sulfur dioxide, and steam is charged to a suitable reactor containing a magnesium oxide catalyst having an initial surface area of approximately 170 square meters per gram. The charge is heated until it vaporizes and additional heat is added to the reactor to bring the charge to reaction temperatures and to lower the surface area of the magnesium oxide catalyst below the threshold level, i.e. about 80 m.²/g. for achieving high yields to the dehydrogenated product. After the desired degree of conversion has been effected, the reaction product is removed and the effluent is quenched in a condenser to about 500° F. where any sulfur formed is liquefied and removed from the stream for burning to $SO_2$ and recycle. The main effluent is further quenched and any remaining $H_2S$ and $CO_2$ is vented off as gases and the $H_2S$ converted to sulfur and then to $SO_2$ for recycle. The crude styrene product is then separated from the water diluent, e.g. by phase separations, the water recycled and the crude styrene sent to a vacuum distillation tower for purification. Unreacted ethylbenzene is recycled and pure styrene recovered for use as a monomer, for example, for the production of polystyrene.

If a non-condensable diluent had been employed in place of steam, the separation of the crude styrene product would have to be carried out at a lower temperature. Thus more extensive refrigeraation and heat exchange equipment would have to be installed after the reactor. In addition, the oxidation of $H_2S$ to sulfur becomes more difficult and expensive in the presence of the gaseous diluent.

Periodically, for example, after about 12 to 24 hours on stream, it may be necessary to regenerate the magnesium oxide catalyst in order to remove any coke that may have formed on the surface of the catalyst. The magnesium oxide catalyst is regenerated by removing the ethylbenzene and sulfur oxide reactants from the reaction zone and thereafter passing oxygen or an oxygen-containing gas such as air along with steam to burn off the carbonaceous deposits which may have formed on the surface of the catalyst.

The concentration of oxygen in the oxygen/steam regenerating gas should be kept between 4 and 20 mol percent and more preferably from about 5 to 10 mol percent.

In view of the fact that the surface area of the magnesium oxide catalyst is critical in producing high yields of the dehydrogenated compound and, as mentioned above, in view of the fact that the upper limit of the surface area of the magnesium oxide catalyst is determined by the temperature employed within the reaction zone, it is essential to maintain the temperature of the magnesium oxide catalyst in the regeneration step below about 1800° F. such that the surface area of the magnesium oxide catalyst does not fall below the threshold level for achieving high yields of the desired dehydrogenated product. Preferably, the rate of the oxygen/steam addition should be maintained such that the temperature in the reaction zone when burning off the carbonaceous particles during the regeneration step is maintained at a temperature below about 1600° F. and more preferably below 1500° F. For example, when the srrface area of the magnesium oxide catalyst is in the preferred range of from about 20 to about 60 square meters per gram, it is essential to maintain the temperature of the magnesium oxide catalyst during the regeneration step at a temperature below 1500° F. (see FIG. II) in order to prevent the surface area of the magnesium oxide going below the preferred range, i.e. 20 to 60 square meters per gram.

Having now described this invention, the following examples will serve to further illustrate the process. However, no limitations are to be implied from these examples since various modifications and variations will be apparent to those skilled in the art.

EXAMPLE I

This example shows the excellent conversions and selectivity levels obtained when steam is employed as the inert diluent in the dehydrogenation of ethylbenzene to styrene with sulfur dioxide and when the surface area of the MgO catalyst is in the narrowly defined critical surface range, i.e. 54 m.²/g. of the instant invention. Table II shows that, when steam is employed as the inert diluent, the selectivity to styrene increases as the $SO_2$ concentration approaches stoichiometric levels, i.e. from about 0.40 to 0.33 mole of $SO_2$ per mole of ethylbenzene. The optimum yield of styrene is achieved at about 0.37 mole of $SO_2$ per mole of ethylbenzene, when 6 moles of steam per mole of ethylbenzene is employed.

TABLE II

Temperature=1,075° F., atmospheric pressure. $H_2O$/EB feed mole ratio=6. EB space velocity=0.6 w./w./hr.

| $SO_2$EB, mole/mole | Percent | | |
|---|---|---|---|
| | EB conv. | Styrene selectivity | Styrene yield |
| 0.40 | 91.4 | 91.4 | 83.5 |
| 0.37 | 91.7 | 91.7 | 84.1 |
| 0.35 | 87.6 | 92.9 | 81.4 |
| 0.33 [1] | 80.5 | 93.5 | 75.3 |

[1] Stoichiometric.

EXAMPLE II

This example shows that when the ethylbenzene dehydrogenation to styrene with $SO_2$ is conducted at elevated pressure, i.e. 20 p.s.i.g., with a surface area of magnesium oxide of about 54 square meters per gram, excellent selectivities and conversion levels to styrene are obtained.

The data in Table III was obtained during 20 successive reaction/regeneration cycles. Each reaction cycle was 6 hours. Each regeneration cycle employed 10% oxygen in admixture with helium/steam and was approximately of one hour's duration.

TABLE III

| Temp., °F. | EB sp. vel., w./w./hr. | Moles/ mole $SO_2$ | EB $H_2O$ | Percent | | |
|---|---|---|---|---|---|---|
| | | | | EB conv. | Styrene selectivity | Styrene yield |
| 1,000 | 0.5 | 0.4 | 10 | 82.7 | 90.3 | 74.7 |
| 1,050 | 0.5 | 0.4 | 8 | 90.6 | 87.8 | 79.6 |
| 1,050 | 0.7 | 0.4 | 8 | 89.3 | 89.9 | 80.3 |
| 1,050 | 0.7 | 0.35 | 8 | 84.0 | 91.8 | 77.7 |
| 1,075 [1] | 0.7 | 0.35 | 10 | 86.6 | 91.6 | 79.3 |

[1] 86.5% recovery of sulfur as $H_2S$; 20th cycle.

EXAMPLE III

This example shows the preferred magnesium oxide surface area when hydrogenating ethylbenzene to styrene at elevated pressures, i.e. 20 p.s.i.g.

TABLE IV

| MgO surface area, m.²/g. | EB sp. vel., w./w./hr. | Temp., °F. | Mole $H_2O$/ mole EB | Percent | | |
|---|---|---|---|---|---|---|
| | | | | EB conv. | Styrene sel. | Styrene yield |
| 54 | 0.7 | 1,075 | 9 | 86 | 92 | 79 |
| 25 | [1] 0.5 | 1,075 | 8 | 79 | 88 | 70 |
| 25 | 0.3 | 1,050 | 10 | 83 | 91 | 76 |

[1] As surface area decreases MgO catalyst becomes denser. Therefore to maintain a constant flowrate, the EB space velocity was reduced.

As the data in Table IV indicates, the preferred magnesium oxide surface area for dehydrogenating ethylbenzene to styrene at elevated pressure occurs in the range of about 54 square meters per gram when using 9 moles of steam as the diluent per mole of ethylbenzene. As the surface area of the magnesium oxide catalyst is lowered to 25 square meters per gram, the conversion and selectivity of ethylbenzene to styrene decreases. However, by operating the reaction at more severe conditions, i.e. lower EB space velocity while lowering the temperature, the yield of styrene is significantly increased. Nevertheless, it is clear that the highest selectivity and conversion levels to styrene in the dehydrogenation of ethylbenzene with $SO_2$ occurs at the preferred magnesium oxide surface area of about 54 square meters per gram. Thus, the necessity of low burn-off temperatures in the reaction zone in regenerating the catalyst with steam and an oxygen containing gas i.e. regeneration step is essential, i.e. see FIG. II, in order to maintain the surface area of the magnesium oxide catalyst at its preferred surface area range of from about 20 to about 60 square meters per gram.

What is claimed is:

1. A process for the dehydrogenation of a dehydrogenatable organic compound having at least one $$-\overset{|}{\text{C}}\text{H}-\overset{|}{\text{C}}\text{H}-$$

grouping which comprises reacting said dehydrogenatable compound, in the vapor phase, at a temperature in the range of from about 800° to about 1500° F. with a sulfur oxide in the presence of steam over a magnesium oxide catalyst having a surface area in the range of from about 4 square meters per gram to about 80 square meters per gram.

2. The process of claim 1 wherein said dehydrogenatable organic compound contains from 2 to about 20 carbon atoms.

3. The process of claim 1 wherein at least one mole of steam per mole of dehydrogenatable compound is present in the reaction zone.

4. The process of claim 1 wherein the sulfur oxide is sulfur dioxide and wherein about 0.01 to 1.0 mole of sulfur dioxide is employed per mole of hydrogen abstracted from the dehydrogenatable organic compound.

5. The process of claim 4 wherein about 0.2 to about 0.7 mole of sulfur dioxide are employed per mole of hydrogen abstracted from the dehydrogenatable compound.

6. A process for the dehydrogenation of a dehydrogenatable compound having at least one $$-\overset{|}{\text{C}}\text{H}-\overset{|}{\text{C}}\text{H}-$$

grouping which comprises reacting said dehydrogenatable compound, in the vapor phase, at a temperature in the range of from about 900 to about 1200° F. at a pressure in the range of from about 1.0 to about 3.0 atmospheres with sulfur dioxide, wherein about 0.01 to 1.0 mole of sulfur dioxide are employed per mole of hydrogen abstracted from the dehydrogenatable compound, in the presence of steam over a magnesium oxide catalyst having a surface area in the range of from about 4 square meters per gram to about 80 square meters per gram.

7. A process according to claim 6 wherein said dehydrogenatable compound is selected from the group consisting of $C_2$–$C_9$ paraffins, $C_3$–$C_9$ monoolefins, $C_8$–$C_{16}$ alkyl benzenes, and $C_8$–$C_{16}$ alkyl and alkenyl substituted cycloaliphatic compounds.

8. The process of claim 6 wherein about 0.2 to about 0.7 mole of sulfur dioxide are employed per mole of hydrogen abstracted from the dehydrogenatable compound.

9. The process of claim 6 wherein at least one mole of steam per mole of dehydrogenatable compound is present in the reaction zone.

10. The process of claim 9 wherein the amount of steam present in the reaction zone varies from 1 to about 12 moles of steam per mole of dehydrogenatable compound.

11. The process of claim 6 wherein the surface area of the magnesium oxide is in the range of from about 20 to about 60 square meters per gram.

12. A continuous process for the dehydration of a dehydrogenatable organic compound having at least one

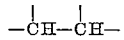

grouping which comprises reacting said dehydrogenatable organic compound in the vapor phase at a temperature in the range of from about 900° to about 1200° F. and at a pressure in the range of from about 1.0 to about 3.0 atmospheres with sulfur dioxide, wherein about 0.2 to about 0.7 mole of sulfur dioxide are employed per mole of hydrogen abstracted from the dehydrogenatable compound, in the presence of at least one mole of steam per mole of dehydrogenatable compound over a magnesium oxide catalyst having a surface area of from about 4 square meters per gram to about 80 square meters per gram for a period of time to dehydrogenate said dehydrogenatable compound, and thereafter passing steam and an oxygen containing gas over the magnesium oxide catalyst at a temperature below about 1800° F. to regenerate said catalyst.

13. The process of claim 12 wherein said dehydrogenatable organic compound is selected from the group consisting of $C_2$–$C_9$ paraffins, $C_3$–$C_9$ monoolefins, $C_8$–$C_{16}$ alkyl benzenes, and $C_8$–$C_{16}$ alkyl and alkenyl substituted cycloaliphatic compounds.

14. The process of claim 12 wherein about 0.2 to about 0.5 mole of sulfur dioxide are employed per mole of hydrogen abstracted from the dehydrogenatable compound.

15. The process of claim 12 wherein the amount of steam in the reaction zone is in the range of from about 4.0 to about 12.0 moles of steam per mole of dehydrogenatable compound.

16. The process of claim 12 wherein the magnesium oxide catalyst has a surface area in the range of from about 20 to about 60 square meters per gram.

17. The process of claim 12 wherein the amount of oxygen in the oxygen-containing gas stream comprising oxygen and steam is in the range of from about 4 to about 20 mol percent oxygen.

18. The process of claim 12 wherein the amount of oxygen in the oxygen-containing gas stream comprising oxygen and steam is in the range of from about 5 to about 10 mol percent and wherein said gas is passed over the magnesium oxide catalyst at a temperature below about 1500° F.

References Cited
UNITED STATES PATENTS

| | | | |
|---|---|---|---|
| 3,299,155 | 1/1967 | Adams | 260—669 |
| 3,403,192 | 9/1968 | Vadekar et al. | 260—669 |

CURTIS R. DAVIS, Primary Examiner

U.S. Cl. X.R.

260—666, 680, 683.3